United States Patent
Erlacher et al.

(10) Patent No.: US 9,527,407 B2
(45) Date of Patent: Dec. 27, 2016

(54) MOTOR VEHICLE WITH DRIVING SAFETY FEATURE

(75) Inventors: Markus Erlacher, Gaimersheim (DE); Christian Berger, Göteborg (SE); Torsten Krüger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 612 days.

(21) Appl. No.: 13/440,439

(22) Filed: Apr. 5, 2012

(65) Prior Publication Data

US 2013/0096779 A1    Apr. 18, 2013

(30) Foreign Application Priority Data

Apr. 6, 2011   (DE) .................. 10 2011 016 229

(51) Int. Cl.
| | | |
|---|---|---|
| *B60R 22/00* | (2006.01) | |
| *B60N 2/02* | (2006.01) | |
| *B60R 22/48* | (2006.01) | |
| *B60R 21/015* | (2006.01) | |

(52) U.S. Cl.
CPC .......... *B60N 2/0276* (2013.01); *B60R 21/015* (2013.01); *B60R 22/48* (2013.01)

(58) Field of Classification Search
None
See application file for complete search history.

(56) References Cited

U.S. PATENT DOCUMENTS

| | | | | |
|---|---|---|---|---|
| 2007/0228703 | A1* | 10/2007 | Breed ........................... | 280/735 |
| 2009/0160675 | A1* | 6/2009 | Piccinini ................ | G08G 1/127 |
| | | | | 340/905 |
| 2009/0164063 | A1* | 6/2009 | Piccinini ............... | B60W 10/06 |
| | | | | 701/37 |
| 2014/0111540 | A1* | 4/2014 | Morimoto et al. .......... | 345/619 |

FOREIGN PATENT DOCUMENTS

| | | |
|---|---|---|
| CN | 1692028 A | 11/2005 |
| CN | 1776392 A | 5/2006 |
| CN | 1787028 A | 6/2006 |
| DE | 37 01 714 A1 | 8/1988 |
| DE | 103 45 726 A1 | 4/2005 |
| DE | 10 2004 012 228 A1 | 9/2005 |
| DE | 10 2004 012 880 A1 | 10/2005 |
| DE | 10 2005 0145 21 A1 | 10/2006 |
| DE | 10 2006 047 311 A1 | 6/2007 |
| DE | 10 2007 002 704 A1 | 7/2008 |
| DE | 10 2008 008 555 A1 | 8/2008 |
| WO | WO2009/115185 | 9/2009 |

OTHER PUBLICATIONS

Chinese Search Report issued in counterpart Chinese Patent Application No. 2012100978053 on Apr. 1, 2015.
English translation of Chinese Search Report issued in counterpart Chinese Patent Application No. 2012100978053 on Apr. 1, 2015.

* cited by examiner

*Primary Examiner* — Adam Alharbi
(74) *Attorney, Agent, or Firm* — Henry M. Feiereisen LLC

(57) ABSTRACT

A motor vehicle including at least one driving safety system which provides a safety feature during travel, and a control device, wherein the control device is configured to determine a first information commensurate with the proper functioning of the at least one driving safety system and to actuate at least a driver side device for adjusting the seat position and/or at least a driver side belt tensioner when the at least one driving safety system malfunctions.

18 Claims, 1 Drawing Sheet

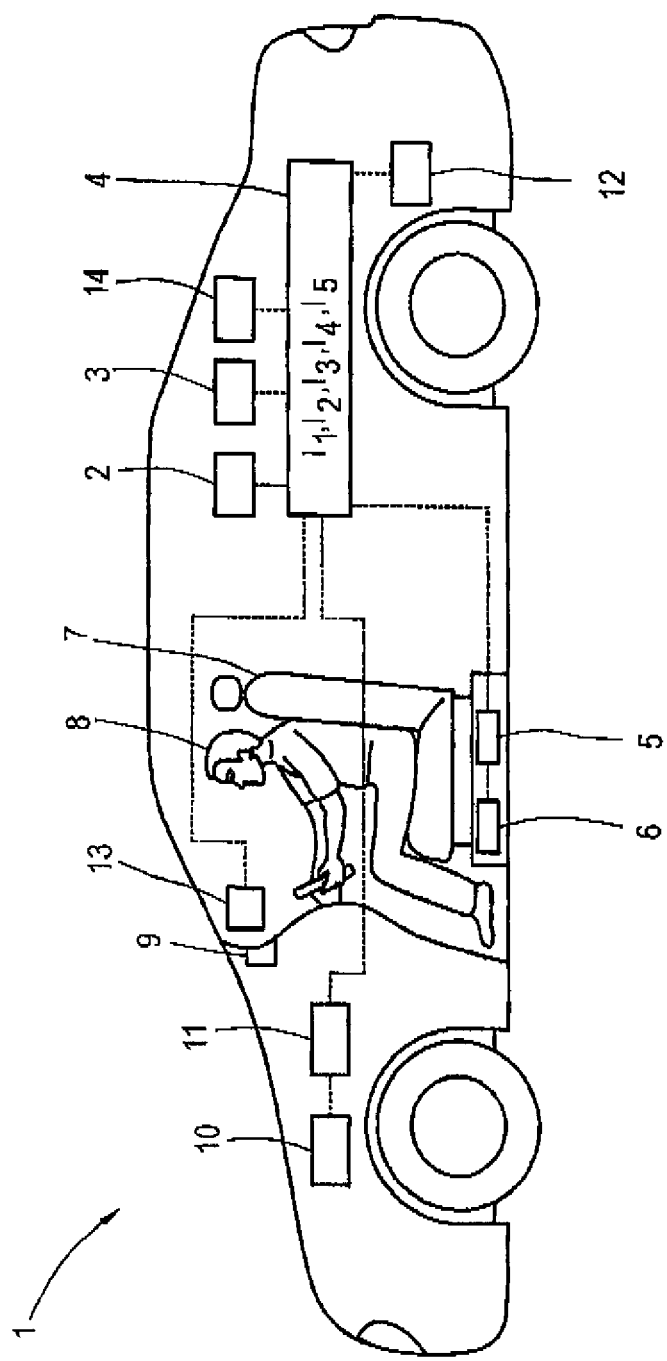

MOTOR VEHICLE WITH DRIVING SAFETY FEATURE

CROSS-REFERENCES TO RELATED APPLICATIONS

This application claims the priority of German Patent Application, Serial No. 10 2011 016 229.1, filed Apr. 6, 2011, pursuant to 35 U.S.C. 119(a)-(d), the content of which is incorporated herein by reference in its entirety as if fully set forth herein.

BACKGROUND OF THE INVENTION

The present invention relates to a motor vehicle, which includes at least one driving safety system which is relevant for safety with regard to driving and a control device.

The following discussion of related art is provided to safety the reader in understanding the advantages of the invention, and is not to be construed as an admission that this related art is prior art to this invention.

As is known, modern motor vehicles have diverse driving safety systems, which offer a high level of driving safety and driving dynamic. Among those are for example, a driving dynamic control or an electronic stability program (ESP), an anti blocking system (ABS), an anti slip regulation (ASR), a so called active steering or the like. Generally, driving safety systems allow a stable driving state of the motor vehicle and regularly support the driver in complicated driving maneuvers.

Correspondingly, the driving safety is compromised immediately when one or more of these driving safety systems malfunction or fail, because modern driving safety systems usually actively influence the driving dynamic by sensors which are assigned to the driving safety systems. When a dangerous situation such as a collision of the motor vehicle with a collision object, arises under these conditions, the driver or maybe also at least one passenger is not optimally positioned in his seat, which is why the full protective effect of certain passive restraining devices such airbags is not realized.

It would therefore be desirable and advantageous to provide an improved motor vehicle in particular with regard to the protection of occupants in case of a malfunctioning of at least one driving safety system.

SUMMARY OF THE INVENTION

According to one aspect of the present invention, a motor vehicle includes a driving safety system providing a safety feature during travel, an adjustment device for adjusting a seat position and/or a belt tensioner, and a control device for determining a first information commensurate with a proper operation of the driving safety system, wherein the control device can be configured to actuate the adjustment device, when determining a malfunction of the driving safety system.

According to another aspect of the present invention, a method for adjusting a position of a seat and/or a driver-side belt tensioner of a motor vehicle, includes the steps of determining a first information commensurate with a proper operation of a driving safety system of the motor vehicle with a control device of the motor vehicle, adjusting the position of the seat and/or the belt tensioner by actuating an actuation device of the motor vehicle with the control device when the first information indicates a malfunction of the driving safety system.

The present invention proposes to regularly test the functioning of the at least one driver safety system preferably continuously i.e. always or in time intervals and to correspondingly determine a first information relating to the functioning of the at least one driving safety system. With the first information, i.e. if the latter indicates that at least one driver safety system malfunctions or is not operational, at least one driver side device for adjusting the seat position and/or at least one driver side belt tensioner (in the following only referred to as "device") is actuated so that in case of an actual dangerous situation such as in particular a collision of the vehicle with a collision object, at least the driver is positioned in his seat so that the full protective effect of corresponding passive retaining devices, such as in particular airbags which protect at least the driver, can be realized. A driver safety system can for example be an anti blocking system, an electronic stability program or an active steering. This enumeration is not complete.

Of course, the actuation of the device for adjusting the driver side seat position and in particular of the driver side belt tensioner does not cause the driver to lose control over the vehicle or to be unable to properly drive the vehicle. Analogous considerations apply of course to the passenger as well as passengers which are present in the rear of the motor vehicle, i.e. also on the passenger side or the rear side a corresponding actuation of a device for adjusting the seat position and/or at least one belt tensioner can preferably occur in case of malfunction of at least one driver safety system of the motor vehicle. Thus, passengers which are present beside the driver are correspondingly also positioned in their seats, so that the full protective effect of certain retaining systems can be realized.

The duration and/or the intensity in particular of the actuation of the belt tensioner can vary and depend on different factors such as in particular the current speed of the motor vehicle, so that for example the actuation of the belt tensioner is interrupted as soon as the speed falls below a minimal speed or the motor vehicle is stationary.

In principle, vehicle occupant specific parameters as for example weight or size can be included in the first information and taken into consideration when actuating the device for adjusting the seat position and the belt tensioner. The vehicle occupant specific parameters can be determined via vehicle side installed sensors as for example seat occupancy sensors, weight sensors, cameras which sense the interior of the vehicle for recognizing the vehicle occupants and/or their dimensions, sensors for detecting the length of a belt or the like, so that a geometrical as well as physical image of the occupants which are present in the motor vehicle can be determined as accurately as possible, with which a corresponding occupant specific and individual actuation of the device for adjusting the seat position or the belt occurs.

The control device can assign different priorities to the driving safety systems which are associated with the motor vehicle, so that a failure of a certain driver safety system does not necessarily lead to an actuation of at least the driver side device for adjusting the seat position and/or at least the driver side belt tensioner. Thus, in a case where for example only a single driver safety system fails, the device for adjusting the seat position and/or the belt tensioner is only actuated when at least one other driving safety system fails.

According to another advantageous feature of the present invention, the control device can be configured to determine a second information indicating the presence of an engaged gear or engaged transmission stage and to actuate the adjustment device by additionally considering the second information.

According to another advantageous feature of the present invention, the control device can be configured to actuate the adjustment device in response to the first information indicating a malfunction of the driving safety system and to the second information indicating that a gear or transmission stage is engaged.

Thus, it is possible to couple the actuation of at least the driver side device for adjusting the seat position and/or at least of the driver side belt tensioner to engagement of a gear stage or a transmission stage, to exclude the possibility of an unnecessary actuation of at least the driver side device for adjusting the seat position and/or at least the driver side belt tensioner in situations where the motor vehicle is immobile because no gear or no transmission stage is engaged.

Correspondingly, the actuation of at least the driver side device for adjusting the seat position and/or at least the driver side belt tensioner better matches the particular need, because the actuation of the device occurs preferably when in addition to the malfunction of the at least one driving safety system indicated by the first information the second information indicates that a gear or a transmission stage which enables the driving operation is engaged.

According to another advantageous feature of the present invention, the control device can be configured to determine a third information indicating a driving state of the motor vehicle and to actuate the adjustment device by additionally considering the third information.

The third information includes for example direct or indirect information relating to the current speed of the motor vehicle which is for example derived from the engine speed, acceleration and/or deceleration values of the motor vehicle etc.

Optionally, certain threshold values which in particular relate to the speed and are for example stored in a memory which is connected to the control device, can be taken into account in the sense of minimal speeds, so that the actuation of the device only occurs when one of the predetermined or predeterminable minimal speeds is exceeded.

According to another advantageous feature of the present invention, the driving state can involve forward driving.

According to another advantageous feature of the present invention, the control device can be configured to actuate the adjustment device in response to the first information indicating a malfunction of the driving safety system and to the third information indicating the driving state.

Thus, the actuation of the device occurs advantageously when in addition to at least the malfunctioning of the at least one driving safety system which is indicated by the first information, the third information indicates in particular a forward drive of the motor vehicle.

According to another advantageous feature of the present invention, the control device can be configured to determine a fourth information indicating the presence of a possible obstacle in vicinity of the motor vehicle and to actuate the adjustment device by additionally considering the fourth information.

In this embodiment, the control device is connected for example to sensors which are installed vehicle side and sense the vicinity of the vehicle which includes a near and distant area, and establishes a fourth information based on the data provided by the sensors which indicate the presence of a possible collision object in the surrounding area of the vehicle in particular in the area ahead of the vehicle. The sensors for sensing the surrounding area of the vehicle can be constructed as near range radar, long distance radar, Lidar-sensor, ultrasound sensor etc.

It is also conceivable, to detect obstacles in the vicinity of the vehicle via a navigation device or a connection of the control device to a device which provides up to date traffic information, with which the control device is connected, so that by taking the current position of the vehicle on the road on which the motor vehicle drives into account, a dangerous situation which lies ahead for example a traffic jam which behind a curve, a collision of other traffic participants, an object on the roadway etc. can be detected in the course of determining the fourth information and be taken into account.

According to another advantageous feature of the present invention, the control device can be configured to actuate the adjustment device in response to the first information indicating a malfunction of the driving safety system and to the fourth information indicating the presence of a possible obstacle. Similarly, in this way an actuation which better matches the particular need is possible.

According to another advantageous feature of the present invention, the control device can be configured to determine a fifth information indicating the presence of a current or prospective potentially hazardous climatic condition with regard to the current position of the motor vehicle and to actuate the adjustment device by additionally considering the fifth information.

According to another advantageous feature of the present invention, the climatic condition can involve slippery road surface, snowfall, rain in relation to an actual position of the motor vehicle Thus, the climatic conditions in the area of the current position of the motor vehicle can be determined via sensors such as temperature, and/or precipitation and/or brightness sensors which are installed in the vehicle, from which for climatic conditions for example slippery road surface can be concluded, when a temperature of below 0° C. with precipitation is given. Also information with regard to slippery roads from an information device which provides up to date weather information can be accessed, if the control device is connected to such an information device. This is particularly expedient since such prospective changes of climatic conditions or such climatic changes which lie ahead can be detected and correspondingly taken into account.

According to another advantageous feature of the present invention, the control device can be configured to actuate the adjustment device in response to the first information indicating a malfunction of the driving safety system and to the fifth information indicating the potential of a hazardous climatic condition. Similarly, in this way, an actuation which matches the particular need is possible.

According to another advantageous feature of the present invention, the driving safety system can include an antilock device, electronic stability program, and active steering.

If the control device takes a further information in addition to the first information into account, the further information can be given different weights or given different priorities, respectively, so that for example the aforementioned fourth information is treated preferentially compared to the third information.

In an exemplary situation, in which the motor vehicle moves toward a collision object which is taken into account by the fourth information, with a speed which is lower than a threshold speed which is taken into account by the third information, the control device when only depending on the third information would accordingly not carry out an actuation of the at least one driver side device for adjusting the seat position and/or at least the driver side belt tensioner. By affording the fourth information more weight or greater priority relative to the third information a corresponding actuation of the device can nevertheless occur, because the fourth information hierarchically ranks above the third information in the structure of information taken into account by the control device.

BRIEF DESCRIPTION OF THE DRAWING

Other features and advantages of the present invention will be more readily apparent upon reading the following description of currently preferred exemplified embodiments of the invention with reference to the accompanying drawing, in which the single FIGURE shows a schematic diagram of a motor vehicle according to the invention.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

The motor vehicle 1 shown in the Figure includes multiple driving safety systems which are safety relevant for driving of which only the two driving safety systems 2, 3 are exemplary shown. The driving safety system 2 is for example an electronic stability system (ESP), and the driving safety system 3 is for example an active steering.

The driving safety systems 2, 3 are connected to a steering device 4, which is configured for determining a first information relating to the proper functioning of the driving safety systems 2, 3. Thus, the control device continuously or in regular intervals checks the proper functioning of the driving safety systems 2, 3 and reports the functioning in the form of the first information I1. If the first information I1 indicates an malfunctioning of at least one of the driving safety systems 2, 3, at least one of the driver side devices 5 for the adjustment of the seat position and/or at least one driver side belt tensioner 6 is actuated. Correspondingly, the driver which occupies the driver seat 7 is positioned or conditioned in his seat position so that the full protective effect of a passive retaining device 9 such as for example an airbag can be realized. Similar considerations apply of course also for further occupants (not shown) present in the motor vehicle 1, i.e., these may also be conditioned via corresponding devices which are assigned to their seats for adjusting the seat position and/or belt tensioner 6.

As mentioned above, when actuating the device 5, vehicle occupant specific parameters such as weight, size etc. which are determined by appropriate vehicle side installed sensors or cameras, can be taken into account. In particular, the conditioning of the driver does not take place in a manner so that the latter is rendered unable to control the motor vehicle 1, so that the intensity in particular of the actuation of the belt tensioner can be reduced or adjusted via corresponding actuators.

The control device 4 can further be configured for determining further information I1, I2, I3, I4, I5, which can be taken into account individually or in groups or altogether, before actuating at least the driver side device 5 for adjusting the seat position and/or at least the driver side belt tensioner 6.

Thus, it is possible for example, that the control device 4 is configured for determining a second information I2 relating to an engaged gear or a engaged transmission stage. Thus, the control device 4 is also connected to a transmission 10 which is arranged in the drive train of the motor vehicle 1. Preferably, the actuation of the device 5 occurs, when in addition to the first information the second information indicates that a gear or a transmission stage which enables a driving operation in particular a forward driving operation is engaged.

In addition, it is possible that the control device 4 is configured for determining a third information I3 relating to the driving status of the motor vehicle 1. For this, the control device 4 is connected to the drive assembly 11 which is also arranged in the drive train of the motor vehicle 1, from which drive assembly 11 an engine speed can be determined for example via an appropriate sensor (not shown). Of course, the control device 4 can also be connected to a speed measuring device such as a speedometer or the like (not shown). Here, it is preferred that the actuation of the device 5 occurs when in addition to the first information I1 the third information I3 indicates a driving, in particular a forward driving of the motor vehicle 1. Optionally, predetermined or predeterminable minimal speeds for example 15 km/h can be taken into account, below which the third information I3 does not indicate the need for actuation of the device 5.

The control device 4 can further be configured for determining a fourth information I4 relating to the presence of possible obstacles in the vicinity of the vehicle, in particular the area ahead of the vehicle. For this, the control device 4 is connected to an appropriate sensor which senses the vicinity of the vehicle in particular the area ahead of the vehicle, for instance in the form of a radar and/or ultrasound sensors. For this, the control device 4 can also be connected to a navigation device 13 which detects a potential dangerous situation in the vicinity of the vehicle for example a tail end of a traffic jam in the region behind a curve of a road on which the motor vehicle currently drives. Advantageously, the actuation of the device 5 occurs when in addition to at least the first information I1 the fourth information I4 indicates a possible obstacle in the vicinity of the vehicle.

It is further preferred that the control device 4 is configured for determining a fifth information I5 relating to current and/or prospective potentially dangerous climatic conditions with regard to the current position of the motor vehicle 1, such as in particular slippery roads, snowfall, or rain. For this, the control device 4 is connected to sensors 14 for sensing climatic conditions, which sensors in particular include temperature sensors, precipitation sensors, i.e. moisture or wetness sensor as well as brightness sensors etc. Advantageously, the actuation of the device 5 occurs when in addition to the first information I1 the fifth information I5 indicates current or prospective dangerous climatic conditions, i.e. climatic conditions which involve potential dangerous situations for the motor vehicle 1, in particular slippery roads, snowfall, rain or freezing rain etc.

The information I2-I5 which is determined by the control device 4 can be given different weight or priority respectively. Thus, it is conceivable that in case of a danger of slippery roads indicated by the fifth information I5, but a current speed of lower than 15 km/h indicated by the third information I3, the actuation of at least the driver side device 5 for adjusting the seat position and/or at least the driver side belt tensioner 6 does not yet occur but only at a current speed exceeding 50 km/h which is also indicated by the third information I3. Of course, a fundamental prerequisite for the actuation of at least the driver side device 5 for adjusting the seat position and/or at least the driver side belt tensioner 6 is the malfunctioning of at least one driver safety system 2, 3.

The device 5 for adjusting the seat position includes various actuation means (not shown) which are connected to the seat 7, and which enable an adjustment of the components of the seat 7, i.e. in particular the seat surface, backrest, headrest, in different directions (upwards, downwards, sideways etc.) or degrees of freedom respectively, and to change or condition the seat position of the driver 8 in this manner.

The belt tensioner 6 includes at least one adjustment means for tightening or tensioning a belt which causes a tightening of the belt in dependence on occupant parameters such as size, weight, volume a, in particular by reducing the roll off length of the belt, with the effect that the driver 8 is changed or conditioned in his seat position.

The motor vehicle 1 according to the invention thus allows optimizing the seat position of at least the driver after failure of at least one driving safety system 2, 3, so that the driver is protected more effectively in the case of a dangerous situation, which also reduces the severity of injuries of at least the driver.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising:
a driving safety system providing a motor vehicle driving safety feature; a control device for determining a first information commensurate with a proper operation of the driving safety system; and
an adjustment device for adjusting a driver and/or a passenger seat position and/or belt tensioner in the motor vehicle,
wherein said control device being configured to actuate the adjustment device, when determining a malfunction of the driving safety system,
wherein said adjustment device being configured to adjust the seat position and/or belt tension, when being actuated by the control device;
wherein the control device is configured to determine a second information commensurate with the presence of an engaged gear or engaged transmission stage and to actuate the adjustment device by additionally considering the second information; and
wherein the control device is configured to actuate the adjustment device in response to the first information indicating a malfunction of the driving safety system and to the second information indicating that a gear or transmission stage is engaged.

2. The motor vehicle of claim 1, wherein the control device is configured to determine a third information commensurate with a driving state of the motor vehicle and to actuate the adjustment device by additionally considering the third information.

3. The motor vehicle of claim 2, wherein the control device is configured to actuate the adjustment device in response to the first information indicating a malfunction of the driving safety system and to the third information indicating the driving state.

4. The motor vehicle of claim 3, wherein the driving state involves forward driving.

5. The motor vehicle of claim 1, wherein the control device is configured to determine a fourth information commensurate with the presence of a possible obstacle in vicinity of the motor vehicle and to actuate the adjustment device by additionally considering the fourth information.

6. The motor vehicle of claim 5, wherein the control device is configured to actuate the adjustment device in response to the first information indicating a malfunction of the driving safety system and to the fourth information indicating the presence of a possible obstacle.

7. The motor vehicle of claim 1, wherein the control device is configured to determine a fifth information commensurate with the presence of a current or prospective potentially hazardous climatic condition in relation to an actual position of the motor vehicle and to actuate the adjustment device by additionally considering the fifth information.

8. The motor vehicle of claim 7, wherein the climatic condition involves slippery road surface, snowfall, rain in relation to an actual position of the motor vehicle.

9. The motor vehicle of claim 7, wherein the control device is configured to actuate the adjustment device in response to the first information indicating a malfunction of the driving safety system and to the fifth information indicating the potential of a hazardous climatic condition.

10. The motor vehicle of claim 1, wherein the driving safety system includes an antilock device, electronic stability program, and active steering.

11. A method for adjusting a position of a seat and/or a belt tensioner of a motor vehicle, comprising:
determining a first information commensurate with a proper operation of a driving safety system of the motor vehicle providing a motor vehicle driving safety feature:
with a control device of the motor vehicle;
actuating an adjustment device of the motor vehicle for adjusting a driver and/or a passenger seat position and/or a belt tensioner in the motor vehicle, by the control device when the control device indicates a malfunction of the driving safety system;
adjusting the position of the seat and/or the belt tensioner by the adjustment device when the adjustment device is actuated by the control device;
determining a second information commensurate with the presence of an engaged gear or engaged transmission stage, wherein the second information is taken into account when adjusting the position of the seat and/or the driver-side belt tensioner; and
wherein the adjustment device is actuated by the control device when the second information indicates that a gear or transmission stage is engaged.

12. The method of claim 11, further comprising determining a third information commensurate with a driving state of the motor vehicle, wherein the third information is taken into account when adjusting the position of the seat and/or the driver-side belt tensioner.

13. The method of claim 12, wherein the driving state involves forward driving.

14. The method of claim 11, further comprising determining a fourth information commensurate with the presence of a possible obstacle in vicinity of the motor vehicle, wherein the wherein the fourth information is taken into account when adjusting the position of the seat and/or the driver-side belt tensioner.

15. The method of claim 11, further comprising determining a fifth information commensurate with the presence of a current or prospective potentially hazardous climatic condition with regard to a current position of the motor vehicle, wherein the fifth information is taken into account when adjusting the position of the seat and/or the driver-side belt tensioner.

16. The method of claim 15, wherein the climatic condition involves slippery road surface, snowfall, rain in relation to an actual position of the motor vehicle.

17. The motor vehicle of claim 1, wherein the control device is configured for determining a plurality of informations of different priorities commensurate with a proper operation of the driving safety system, and for actuating the adjustment device, when determining a malfunction of the driving safety system of a higher priority.

18. The method of claim 11, further comprising determining a plurality of information of different priorities commensurate with a proper operation of a driving safety system of the motor vehicle, actuating an adjustment device of the motor vehicle for adjusting a seat position and/or a belt tensioner by the control device when the control device indicates a malfunction of the driving safety system of a higher priority.

* * * * *

UNITED STATES PATENT AND TRADEMARK OFFICE
CERTIFICATE OF CORRECTION

PATENT NO. : 9,527,407 B2
APPLICATION NO. : 13/440439
DATED : December 27, 2016
INVENTOR(S) : Markus Erlacher, Christian Berger and Torsten Krüger It is certified that error appears in the above-identified patent and that said Letters Patent is hereby corrected as shown below:

On the Title Page

Please add (73) -- AUTOMOTIVE SAFETY TECHNOLOGIES GMBH, GERMANY --

Signed and Sealed this
Sixth Day of June, 2017

Michelle K. Lee
*Director of the United States Patent and Trademark Office*